United States Patent [19]

Nakatsu

[11] Patent Number: 4,901,299
[45] Date of Patent: Feb. 13, 1990

[54] OPTICAL DISK READING HEAD CONTROLLER

[75] Inventor: Keiji Nakatsu, Amagasaki, Japan

[73] Assignee: Mitsubishi Denki Kabushiki Kaisha, Japan

[21] Appl. No.: 138,952

[22] Filed: Dec. 29, 1987

[30] Foreign Application Priority Data

Jan. 7, 1987 [JP] Japan .................................. 52-2291

[51] Int. Cl.⁴ .............................................. G11B 17/22
[52] U.S. Cl. ........................................ 369/32; 369/43; 369/46
[58] Field of Search ............................ 369/32, 43–46; 250/201 DF

[56] References Cited

U.S. PATENT DOCUMENTS 4,484,319 11/1984 Koshi et al. ...................... 369/32 X
4,615,023 9/1986 Inada et al. ...................... 369/44 X
4,677,602 6/1987 Okano et al. ..................... 369/46 X

FOREIGN PATENT DOCUMENTS 63-10324 1/1988 Japan .

OTHER PUBLICATIONS

"Tracking Servo for Small Size Optical Disk System", Inada et al., Optical Data Mass Storage II, 1986.

Primary Examiner—Aristotelis M. Psitos
Attorney, Agent, or Firm—Leydig, Voit & Mayer

[57] ABSTRACT

An optical disk reading apparatus having a carriage on which a tracking actuator and a photosensor unit are mounted and driven by a head actuator for moving a spot of a light beam in a direction traversing tracks on an optical disk and for detecting first position and second position signals indicative of the position of the spot on the tracks through addition and subtraction of the electric signals corresponding to changes in the quantities of light reflected from the tracks upon the movement of the spot and including circuitry for accurately placing the spot on a desired track of the disk even when the first and second position signals contained omissions.

5 Claims, 6 Drawing Sheets

T: DELAY TIME

T: DELAY TIME

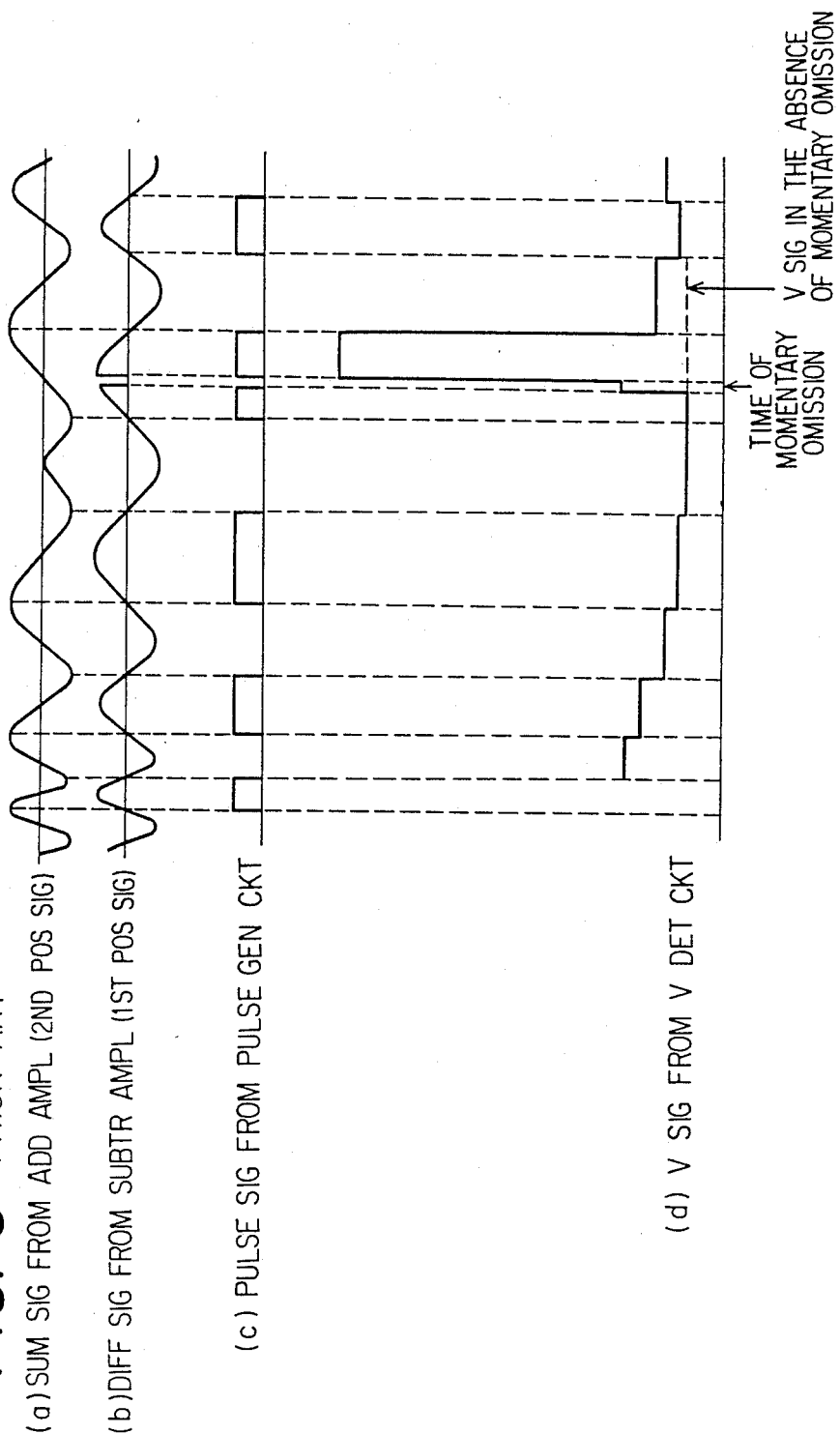

OPTICAL DISK READING HEAD CONTROLLER

BACKGROUND OF THE INVENTION

This invention relates to an optical disk driving apparatus on which information is recorded or reproduced by optical means while a disk-shaped record carrier is being rotated and, more particularly, to the control system of the apparatus.

FIG. 7 is a block diagram showing the control system of a prior art optical disk driving apparatus which is similar to an apparatus disclosed in Japanese Patent Application 156526/1986. FIG. 8 is a diagram of the signal waveform of a velocity detection circuit which detects a velocity signal when the spot of a light beam traverses the track of an optical disk. Referring to FIG. 7, numeral 1 indicates an optical disc record carrier in which information is to be recorded or has been recorded on concentric or spiral tracks at predetermined intervals. Numeral 2 is a light beam which is a medium for transmitting information to or from the optical disk. Numeral 3 is an optical head, numeral 4 is the carriage of the optical head, and numeral 5 is a head actuator which drives the carriage to move the light beam 2 in a direction traversing the track of the optical disk 1. Shown at numeral 6 is a tracking actuator which is mounted on the carriage 4. The tracking actuator 6 is furnished with a condensing lens for focusing the light beam 2 into a spot on the tracks of the optical disk 1 and is turnable in the moving direction of the head actuator 5. The tracking actuator is so constructed that the spot of the light beam 2 covers a predetermined number of tracks of the optical disk.

Numeral 7 denotes two photodetectors or sensors through which the quantity of light from the light beam 2 reflected from the optical disk 1 is converted into an electric signal that is delivered as an output. The electric signal which corresponds to the quantity of the reflected light from the light beam 2 falling on each of the sensor parts is output from the respective sensor part. A subtractive amplifier 11 receives the electric signals from the respective photodetectors 7 and produces a difference signal corresponding to the movement of the spot of the light beam 2 across the tracks of the optical disk 1. An additive amplifier 12 receives the electric signal from the respective photodetectors and produces a sum signal corresponding to the movement of the spot of the light beam 2 across the tracks of the optical disk 1.

A velocity detection circuit 13 detects a velocity signal when the spot of the light beam 2 traverses the tracks of the optical disk 1 from the difference signal produced by the subtractive amplifier 11. A direction detection circuit 14 detects a direction signal indicative of a direction in which the spot of the light beam 2 moves from the difference signal produced by the subtractive amplifier 11 and the sum signal produced by the additive amplifier 12, considering the phase relationship of the waveforms of the respective signals. Numeral 15 denotes a velocity direction designation circuit in which the direction signal received from the direction detection circuit 14 is combined with the velocity signal received from the velocity detection circuit 13, the resulting signal being provided as an output. On the basis of the difference signal produced by the subtractive amplifier 11, a pulse generator circuit 16 generates a pulse signal each time the spot of the light beam 2 traverses the track of the optical disk 1.

A track counter 17 counts the number of remaining tracks which the spot of the light beam 2 is to traverse on the optical disk 1 in accordance with an externally applied signal corresponding to the number N of tracks to be crossed to reach a target track. The pulse signal is delivered from the pulse generator circuit 15 and provides the count signal as an output. Shown at numeral 18 is a reference velocity generator circuit which receives the count signal from the track counter 17. Initially, the reference velocity generator circuit 18 determines and stores a reference velocity pattern corresponding to the number of the remaining tracks, namely, the number of the tracks to be crossed. Circuit 18 produces reference velocity signals successively as it receives the count signals from the track counter 17 corresponding to the gradual decrease of the number of the remaining tracks. A reference velocity direction designation circuit 19 combines an externally applied direction signal D indicative of the moving direction of the spot of the light beam 2 with the reference velocity signal received from the reference velocity generator circuit 18. Circuit 19 provides the resulting signal as an output. A velocity error detection circuit 21 receives the velocity signal from the velocity direction designation circuit 15 and the reference velocity signal from the reference velocity direction designation circuit 19 and compares them to provide a velocity error signal. Numeral 22 represents an amplifier circuit which amplifies the velocity error signal received from the velocity error detection circuit 21 and controls the velocity of the head actuator 5. Numeral 25 represents a tracking servo pull-in command circuit which receives the difference signal from the subtractive amplifier 11, the velocity signal from the velocity detection circuit 13, and the count signal from the track counter 17 and produces a position control command signal when the velocity of the spot of the light beam 2 has decreased below a predetermined velocity at a predetermined track of the optical disk 1 before the track target.

Numeral 26 indicates a tracking servo circuit which receives the difference signal from the subtractive amplifier 11 and the position control command signal from the tracking servo pull-in command circuit 25 and positions the spot of the light beam 2 on the target track of the optical disk 1 through the position control of the tracking actuator 6.

The prior art optical disk driving apparatus is constructed as described above, and the operation thereof will now be described. Track access control modes for positioning the spot of the light beam 2 on the target track of the optical disk 1 include a velocity control mode wherein the carriage 4 is driven by the head actuator 5 to move the spot of the light beam 2 in the direction traversing the track of the optical disk 1. In a position control mode, when the spot of the light beam 2 has decelerated below the predetermined velocity at the predetermined track of the optical disk 1, the tracking actuator 6 is controlled to stop so that the center of the spot of the light beam 2 and the target track are coincident.

First, in the velocity control mode, the signal corresponding to the number of tracks to be accessed (N) is externally applied to the track counter 17. Since the track counter 17 initially has no pulse signal from the pulse generator circuit 16, it regards the applied number of tracks to be accessed (N) as the number of remaining tracks and produces a count signal corresponding thereto. The reference velocity generator circuit 18 receives this count signal, determines and stores the reference velocity pattern in advance, and successively produces from track counter 17 reference velocity signals in accordance with the number of remaining tracks. The reference velocity direction designation circuit 19 combines an externally applied direction signal D indicative of the moving direction of the spot of the light beam 2 with the reference velocity signal and produces a resulting reference velocity signal. This reference velocity signal, including the direction, and the velocity signal, with the designated direction received from the velocity direction designation circuit 15, are applied to and compared by the velocity error detection circuit 21. The velocity error signal from circuit 21 is amplified by the amplifier circuit 22 to control the moving velocity of the head actuator 5.

In accordance with the reference velocity pattern, the head actuator 5 accelerates through a predetermined number of tracks, thereafter reaches a constant velocity, and decelerates when a predetermined number of tracks has been crossed. Due to the velocity control of the head actuator 5, the spot of the light beam 2 traverses the tracks of the optical disk 1 and moves to a target track. When a track is traversed, the quantity of the light beam 2 reflected from the optical disk 1 changes. When the quantities of the reflected light of the light beam 2 impinging on the respective sensor parts of photodetector unit 7 have changed, these sensor parts convert the changes of the light quantities into the electric signals. The subtractive amplifier 11 and the additive amplifier 12 receive the electric signals from the two divided photodetectors 7 and supply the difference signal (FIG. 8(b)) and the sum signal (FIG. 8(a)), respectively.

The periods of the difference signal and the sum signal are determined by the velocity at which the spot of the light beam 2 moves across the tracks of the optical disk 1. In the waveform of the difference signal, the zero point of every cycle indicates that the center of the track of the optical disk 1 has coincided with the center of the spot of the light beam 2. The velocity detection circuit 13 receives the difference signal from the subtractive amplifier 11, detects the velocity signal (FIG. 8(d)) from the period thereof, and produces this velocity signal as an output. The direction detection circuit 14 receives the difference signal from the subtractive amplifier 11 and the sum signal from the additive amplifier 12 and produces a direction signal indicative of the moving direction of the spot of the light beam 2 on the basis of the phase relationship between the waveforms of the received signals.

In the velocity direction designation circuit 15, the direction signal received from the direction detection circuit 14 is combined with the velocity signal received from the velocity detection circuit 13. In addition, the pulse generator circuit 16 receives the difference signal (FIG. 8(b)) from the subtractive amplifier 11 and generates a signal transition, i.e, rectangular pulse signal, (FIG. 8(c)) at the zero crossing point of every cycle of the difference signal waveform, indicating that the spot of the light beam 2 has traversed a track. The track counter 17 receives those pulses and successively subtracts them from the externally applied signal corresponding to the number of tracks to be accessed (N). Counter 17 thereby determines the number of tracks remaining to be traversed by the spot of the light beam 2 and produces a count signal containing that information.

The reference velocity generator circuit 18 receives th count signals and successively generates reference velocity signals in accordance with the reference velocity pattern previously determined and stored. In the reference velocity direction designation circuit 19, the externally applied direction signals D indicative of the direction in which the spot of the light beam 2 is to move is combined with the reference velocity signals, the resulting signal being generated by circuit 19. The velocity error detection signal 21 compares the velocity signal for the designated direction from the velocity direction designation circuit 15 with the reference velocity signal for the designated direction from the reference velocity direction designation circuit 19 and produces a velocity error signal. The velocity error signal is amplified by the amplifier circuit 22 to control the subsequent moving velocity of the head actuator 5. The tracking servo pull-in command circuit 25 receives the difference signal from the subtractive amplifier 11, the velocity signal from the velocity detection circuit 13, and the count signal from the track counter 17. If the moving velocity of the spot of the light beam 2 is lower than a predetermined velocity when the spot has come to a predetermined track before the target track, for example, one track before the same, the tracking servo pull-in command circuit 25 produces a position control command signal, whereupon the velocity control mode shifts to the position control mode.

In the position control mode, the tracking servo circuit 26 receives a position control command signal from the tracking servo pull-in command circuit 25 and the difference signal from the subtractive amplifier 11 and produces a tracking signal, taking into account the phase of the difference signal waveform from the subtractive amplifier 11. Thus, the tracking actuator 6 is controlled and is stopped with the center of the spot of the light beam 2 coincident with the center of the target track to finish the so-called "track pull-in". Thereafter, information is recorded and reproduced while the spot of the light beam 2 is following the target track of the rotating optical disk 1.

With the prior art optical disk driving apparatus constructed and operated as described above, when information is recorded in the form of a pit on the track or when there is a defect on a track or between tracks, the quantity of light reflected from the corresponding part is momentarily zero when the spot of the light beam 2 traverses the track or tracks of the optical disk 1. As a result, intermittent electric signals are delivered from the respective sensor parts of the photodetectors 7. Upon receiving the intermittent electric signals, the subtractive amplifier 11 and the additive amplifier 12 produce a difference signal having a momentary omission. The sum and difference signals are as respectively shown in FIGS. 8(b) and 8(a). When the difference signal having the momentary omission enters the pulse generator circuit 16, the number of the pulse signals to be delivered to the track counter 17 increases and an erroneous number of remaining tracks is counted (FIG. 8(c)). When the difference signal enters the velocity detection circuit 13, an erroneous velocity signal is detected (FIG. 8(d)). Therefore, the prior art has had a problem in lengthening the track access time required for positioning the spot of the light beam 2 on the target track of the optical disk 1.

SUMMARY OF THE INVENTION

This invention has been made in order to solve the problem mentioned above and has for its object the provision of an optical disk driving apparatus in which the number of remaining tracks is correctly counted, even when, due to information recorded in the form of a pit or a defect on a track or between tracks, a difference signal and a sum signal having momentary omissions are respectively delivered from a subtractive amplifier and an additive amplifier when the spot of a light beam traverses the track or tracks of an optical disk. In the invention, a velocity signal is detected more precisely so that the spot of the light beam can be efficiently positioned on the target track of the optical disk.

An optical disk driving apparatus according to this invention includes a tracking actuator furnished with a condensing lens, which forms a spot of the light beam on tracks disposed on a surface of a rotating disk, that permits the spot to traverse a predetermined number of the tracks, and a photosensor unit, which senses the quantities of the light beam reflected from the disk surface and converts them into electric signals. The tracking actuator is mounted on a carriage that is driven by a head actuator to move the spot of the light beam in a direction traversing the tracks to detect a first position signal and a second position signal. The first and second position signals indicate the position of the spot on the tracks through addition and subtraction of the electric signals corresponding to the changes of the quantities of the reflected light attendant upon the movement. The tracking actuator includes, for the oscillating waveform of the first position signal, first waveshaping means for causing the half wave of the waveform that is greater than the mean of the waveform and the half wave of the waveform that is smaller than the mean of the oscillating waveform of the first position signal to correspond, respectively, to a single rectangular pulse and to a zero amplitude signal for each cycle of the waveform and for converting the rectangular pulse and zero amplitude signal into a first shaped position signal delayed by a predetermined time, and, for the oscillating waveform of the second position signal, second waveshaping means for causing the half wave of the waveform that is greater than the mean of the waveform and the half wave of the waveform that is smaller than the mean of the oscillating waveform of the second position signal corresponding, respectively, to a single rectangular pulse and to a zero amplitude signal for each cycle of the waveform, and for converting the rectangular pulse and zero amplitude signal into a second shaped position signal delayed by a predetermined time.

In this invention, the electric signals which are produced by the photosensor unit corresponding to changes in the quantities of reflected light attendant upon the movement of the spot of the light beam across the track are added and subtracted to produce first and second position signals indicative of the position of the spot on the track, and the half wave that is greater and the half wave that is smaller than the arithmetic mean of the oscillating waveform of each of the position signals are caused to correspond to a single rectangular pulse and a zero amplitude signal for each cycle, respectively, whereby the first and second shaped position signals are respectively converted into the first and second shaped position signals delayed for predetermined time intervals.

BRIEF DESCRIPTION OF THE DRAWINGS

FIG. 8, consisting of (a)–(d), is a diagram of the signal waveform of a velocity detection circuit for use in the control system of FIG. 7.

DESCRIPTION OF THE PREFERRED EMBODIMENTS

Figure 1:
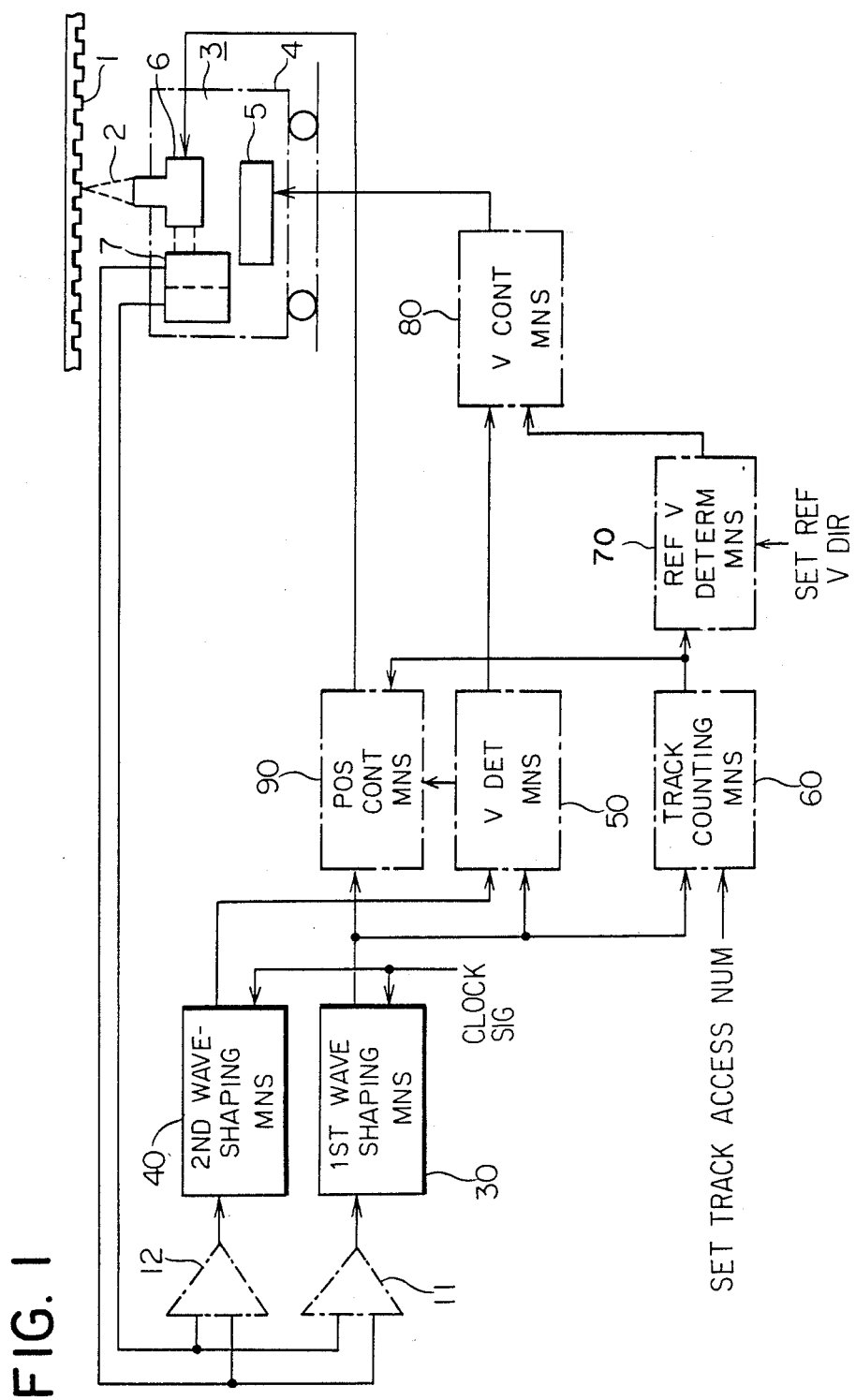
FIG. 1 is a diagram showing an embodiment of an optical disk driving apparatus according to this invention.

FIG. 1 is a diagram which shows an embodiment of an optical disk driving apparatus according to this invention. In FIG. 1, elements 1–7, 11, and 12 are the same as in the prior art apparatus described above. The embodiment further comprises first waveshaping means 30 for causing the positive half wave and negative half wave of a first position signal, which is the difference signal produced by the subtractive amplifier 11, to correspond to a single rectangular pulse and a zero amplitude signal for each cycle, respectively, and for converting those pulses and zero amplitude signals into a first shaped position signal delayed for a predetermined time in response to an externally applied clock signal; velocity detection means 50 for generating a direction signal indicative of a direction for a velocity at which the spot of the light beam 2 traverses the track of the optical disk 1 in response to the first shaped position signal received from the first waveshaping means and the second shaped position signal received from the second waveshaping means, thereby to produce the velocity signal including a direction indication; track counting means 60 for counting the number of remaining tracks which the spot of the light beam 2 is to traverse on the basis of an externally applied signal corresponding to the number of tracks to be crossed to reach a target track and the first shaped position signal received from the first waveshaping means 30 and for producing a count signal; reference velocity determination means 70 receiving the count signal from the track counting means 60 for determining and initially storing a reference velocity pattern corresponding to the number of remaining tracks, namely, the number of tracks to be crossed to reach the target track, for generating a direction signal indicative of a direction of movement of the spot of the light beam 2 that is applied to the reference velocity signal successively on the basis of the count signals and for producing the reference velocity signal with the direction included; velocity control means 80 receiving the reference velocity signal with the included direction information from the reference velocity determination means 70 and the velocity signal with the included direction information from the velocity detection means 50 for comparing these signals to each other to detect a velocity error signal for application to a velocity control of the head actuator 5; and position control means 90 for producing a tracking signal when the velocity of the spot of the light beam 2 has become lower than a predetermined velocity at a predetermined track before the target track based on the velocity signal received from the velocity detection means 50, the count signal received from the track counting means 60, and the first shaped position signal delivered from the first waveshaping means 30, to control the position of the tracking actuator 6 and stop it with the center of the spot of the light beam 2 coincident with the center of the target track.

In this optical disk driving apparatus, the electric signals from the two divided photodetectors 7, in response to the movement of the spot of the light beam 2 across the track of the optical disk 1, are subtractively amplified by the subtractive amplifier 11, the first position signal being the difference signal, while they are additively amplified by the additive amplifier 12, the second position signal being the sum signal. Using the first waveshaping means 30 and the second waveshaping means 40, the positive and negative half cycles of the oscillating waveforms of the first and second position signals are respectively caused to correspond to the individual rectangular pulses and the zero amplitude signals for each cycle, respectively, and the first and second position signals are converted into the first and second shaped position signals delayed for the predetermined time on the basis of the external clock signal, respectively.

The velocity signal of the designated direction indicating the direction and the velocity at which the spot of the light beam 2 traverses the track is detected by the velocity detection means 50 on the basis of the first and second shaped position signals. In addition, the count signal indicative of the number of remaining tracks which the spot of the light beam 2 is to traverse is detected by the track counting means 60 on the basis of the first shaped position signal and the externally applied number of tracks to be accessed, i.e., crossed, before reaching the target track. The reference velocity determination means 70 receives the count signal, initially determines and stores a reference velocity pattern corresponding to the number of tracks to be accessed to the target track, and supplies the externally applied direction signal indicative of the direction in which the spot of the light beam 2 is to move to the reference velocity signal successively on the basis of the count signals, whereupon the reference velocity signal having the designated direction is output. The velocity control means 80 receives and compares the reference velocity signal with the designated direction information from the reference velocity determination means 70 and the velocity signal with the designated direction information from the velocity detection means 50 to detect the velocity error signal and control the velocity of the head actuator 5. When, under this velocity control, the spot of the light beam 2 has traversed the tracks and has become lower in velocity than the predetermined velocity at the predetermined track before the target track, the tracking signal is produced by the position control means 90, and the position of the tracking actuator 6 is controlled and stopped with the centers of the spot of the light beam 2 and the target track coincident.

Figure 2:
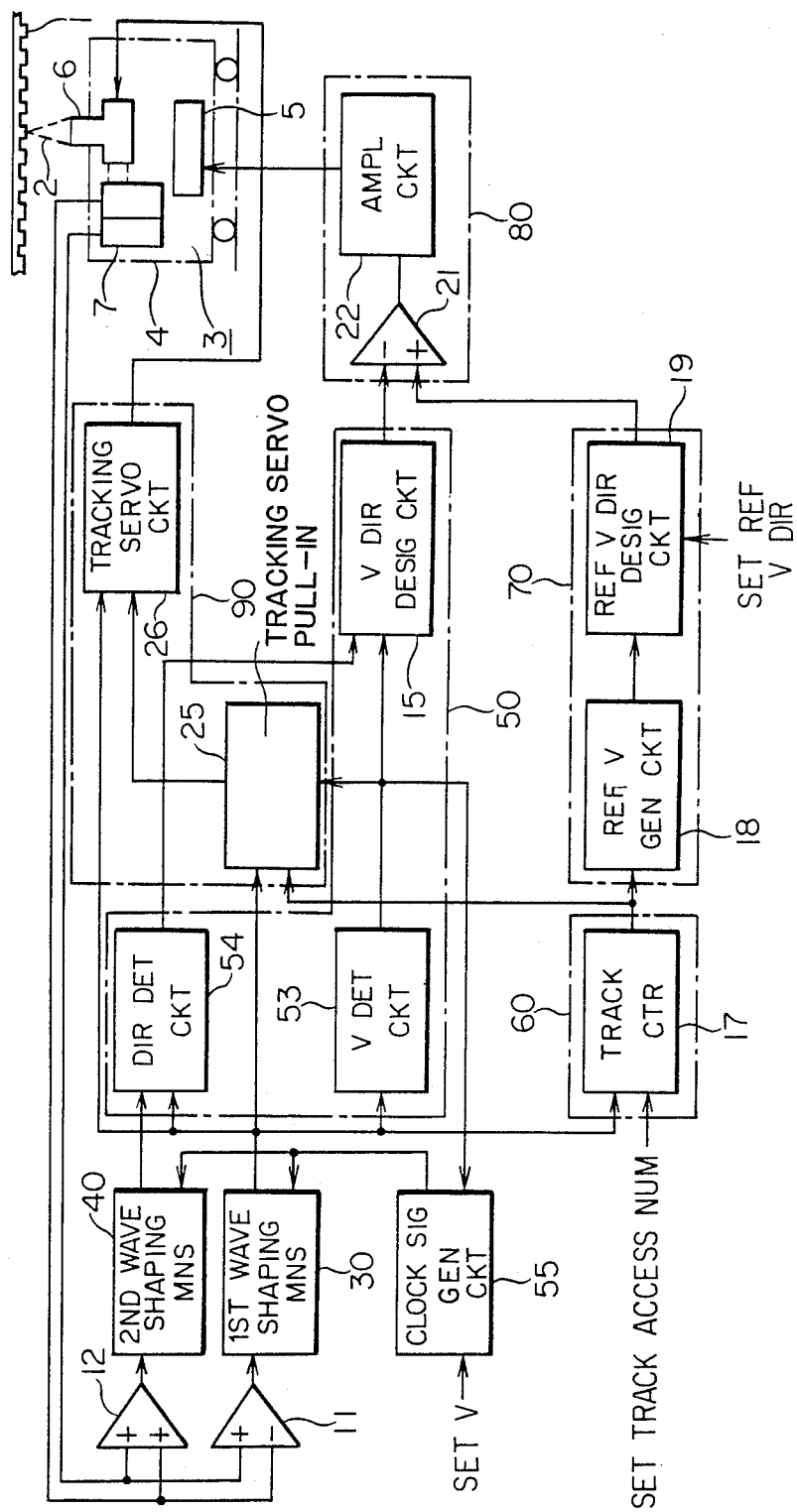
FIG. 2 is a block diagram showing the embodiment of FIG. 1 in more detail.
Figure 3:
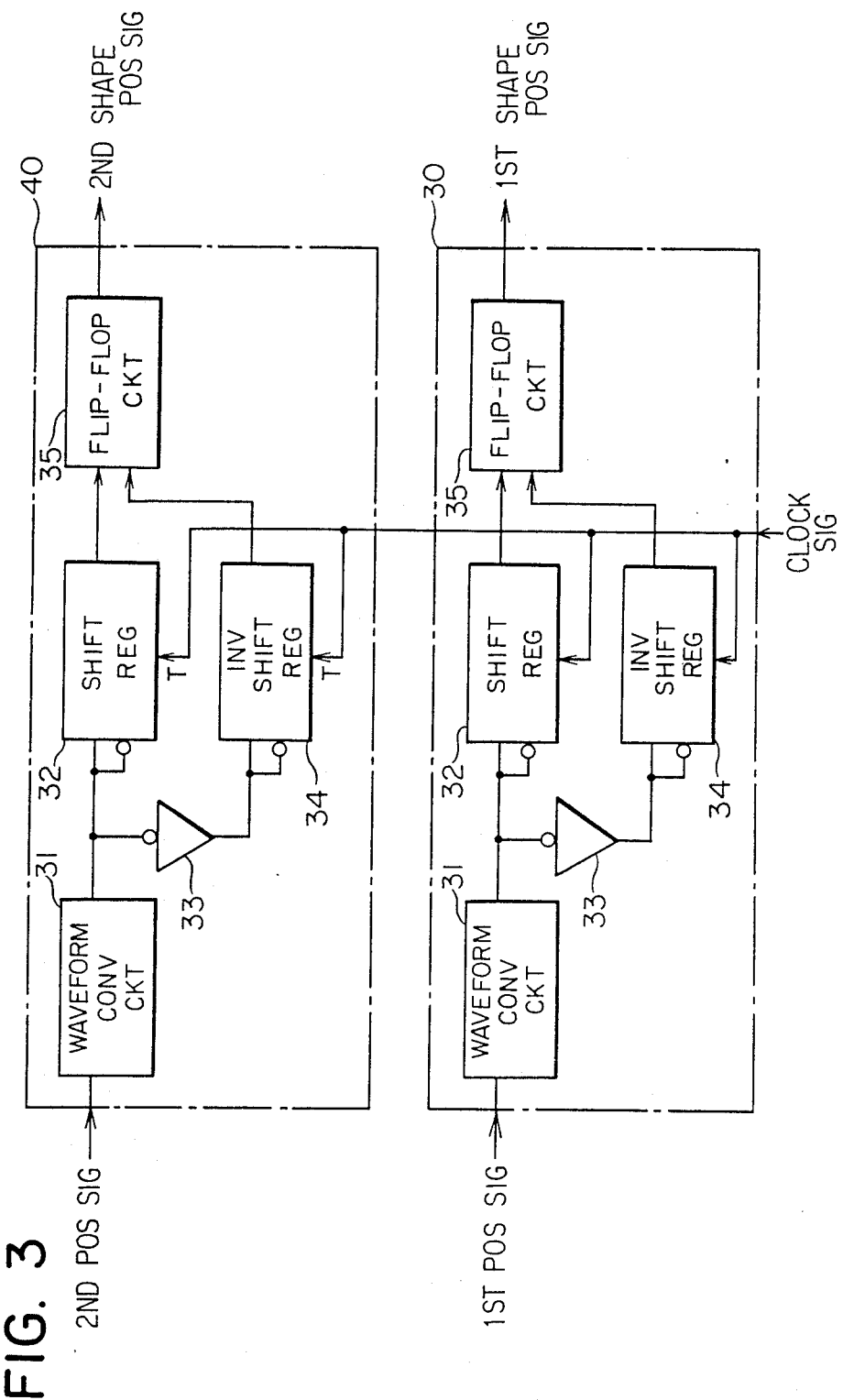
FIG. 3 is a block diagram showing the details of portions in FIG. 2.

FIG. 2 is a block diagram showing the embodiment of FIG. 1 in more detail, while FIG. 3 is a block diagram showing the details of portions in FIG. 2. In FIG. 2, elements 15, 17–19, 21, 22, 25, and 26 are the same as in the prior art apparatus described above. Numeral 53 denotes a velocity detection circuit that detects a velocity signal indicative of the velocity at which the spot of the light beam 2 traverses the track of the optical disk 1 on the basis of the first shaped position signal from the first waveshaping means 30. Numeral 54 denotes a direction detection circuit that detects the direction signal indicative of the direction in which the spot of the light beam 2 moves on the basis of the first shaped position signal from the first waveshaping means 30 and the second shaped position from the second waveshaping means 40 and the phase relationship of these signals. Numeral 55 denotes a clock signal generator circuit that compares an externally applied velocity setting signal and the velocity signal from the velocity detection circuit 53 to produce a clock signal having a high frequency when the velocity signal is greater and having a low frequency when the velocity signal is smaller.

In FIG. 3, numeral 31 represents a waveform converter circuit which receives the first position signal, i.e., the difference signal from the subtractive amplifier 11, and converts the first position signal into a first position pulse signal wherein the positive half wave and negative half wave of the oscillating waveform of the former signal correspond to a rectangular pulse and a zero output, respectively. Alternatively, the waveform converter circuit 31 receives the second position signal, i.e., the sum signal from the additive amplifier 12, and converts the second position signal into a second position pulse signal wherein the positive half wave and negative half wave of the oscillating waveform of the former signal correspond to a rectangular pulse and a zero output, respectively. Numeral 32 denotes a shift register which receives the first position pulse signal from the waveform converter circuit 31 and produces a first shift pulse signal that rises after a predetermined delay time based on the clock signal from the clock signal generator circuit 55 and falls simultaneously with the first position pulse signal. Alternatively, the shift register 32 receives the second position pulse signal from the waveform converter circuit 31 and produces a second shift pulse signal that rises after a predetermined delay time based on the clock signal from the clock signal generator circuit 55 and falls simultaneously with the second position pulse signal.

Numeral 33 denotes an inverter which receives the first position pulse signal from the waveform converter circuit 31 and produces a first inverted position pulse signal of inverted polarity. Alternatively, the inverter 33 receives the second position pulse signal from the waveform converter circuit 31 and produces a second inverted position pulse signal of inverted polarity.

Numeral 34 denotes an inverting shift register which receives the first inverted position pulse signal from the inverter 33 and provides a first inverted shift pulse signal that rises with the predetermined delay time based on the clock signal from the clock signal generator circuit 55 and falls simultaneously with the first inverted position pulse signal. Alternatively, the inverting shift register 34 receives the second inverted position pulse signal from the inverter 33 and produces a second inverted shift pulse signal that rises with the predetermined delay time based on the clock signal from the clock signal generator circuit 55 and falls simultaneously with the second inverted position pulse signal.

Numeral 35 represents a flip-flop circuit. When circuit 35 is supplied with either the first shift pulse signal from the shift register 32 or the first inverted shift pulse signal from the inverting shift register 34, it produces the first shaped position signal wherein the rectangular pulse or the zero output continues until the other of those two pulse signals is next received. Alternatively, when the flip-flop circuit 35 is supplied with either the second shift pulse signal from the shift register 32 or the second inverted shift pulse signal from the inverting shift register 34, it produces the second shaped position signal wherein the rectangular pulse or the zero output continues until the other of the pulse signals is next received.

Each of the first waveshaping means 30 and the second waveshaping means 40 includes a waveform converter circuit 31, a shift register 32, an inverter 33, an inverting shift register 34, and a flip-flop circuit 35. The velocity detection circuit 50 includes a velocity detection circuit 53, a direction detection circuit 54, and a velocity direction designation circuit 15. The track counting means includes the track counter 17; the reference velocity determination means includes the reference velocity generator circuit 18 and the reference velocity direction designation circuit 19; the velocity control means 80 includes the velocity error detection circuit 21 and amplifier circuit 22; and the position control means 90 includes the position control command circuit 25 and the track servo circuit 26.

Figure 4:
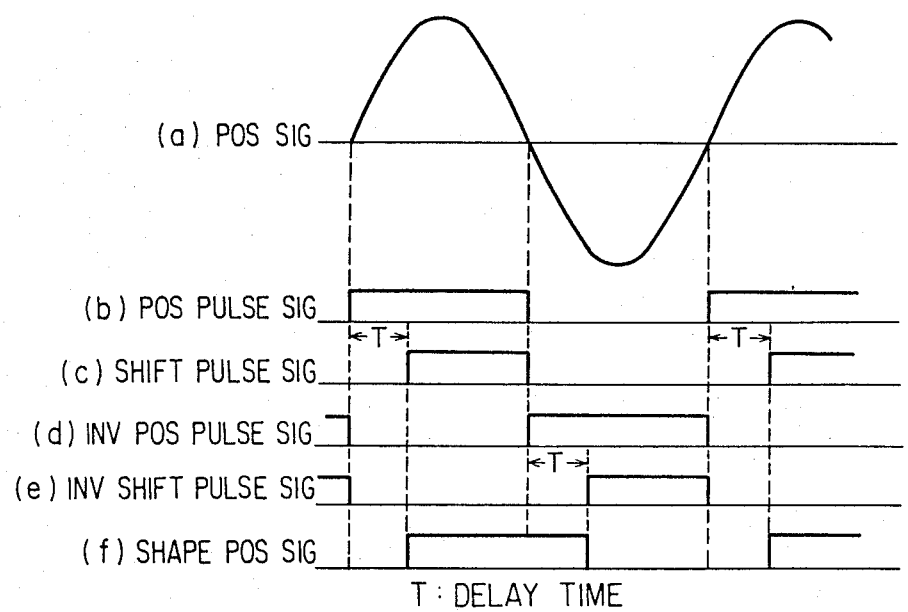
FIG. 4, consisting of (a)–(f), is a signal waveform diagram showing the respective signal waveforms of first waveshaping means and second waveshaping means when a first position signal and a second position signal do not include momentary omissions.
Figure 5:
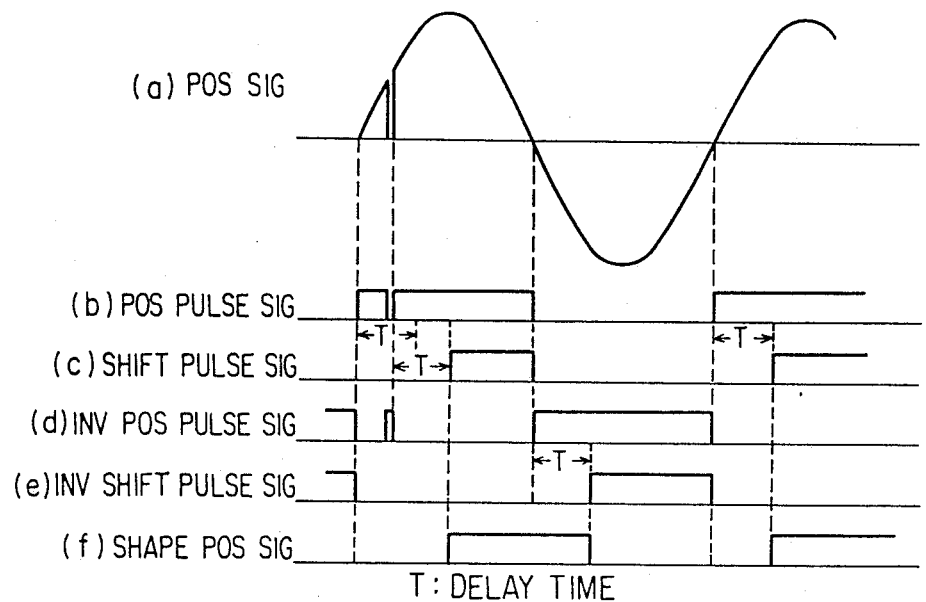
FIG. 5, consisting of (a)–(f), is a signal waveform diagram showing the respective signal waveforms of the first wave-shaping means and the second waveshaping means when the first position signal and the second position signal include momentary omissions during a delay of a predetermined time.
Figure 6:
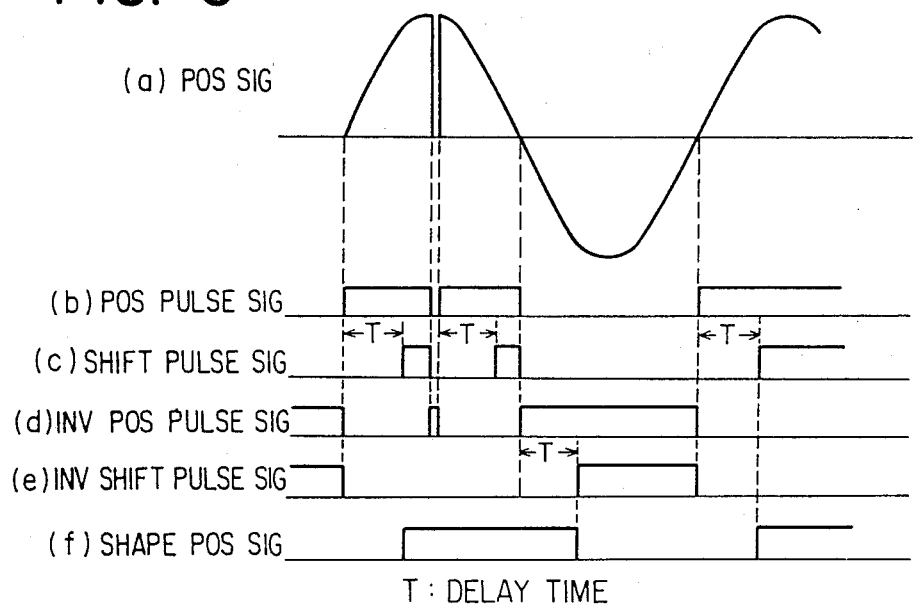
FIG. 6, consisting of (a)–(f), is a signal waveform diagram showing the respective signal waveform of the first wave-shaping means and the second waveshaping means when the first position signal and the second position signal include momentary omissions after a delay of the predetermined time.
Figure 7:
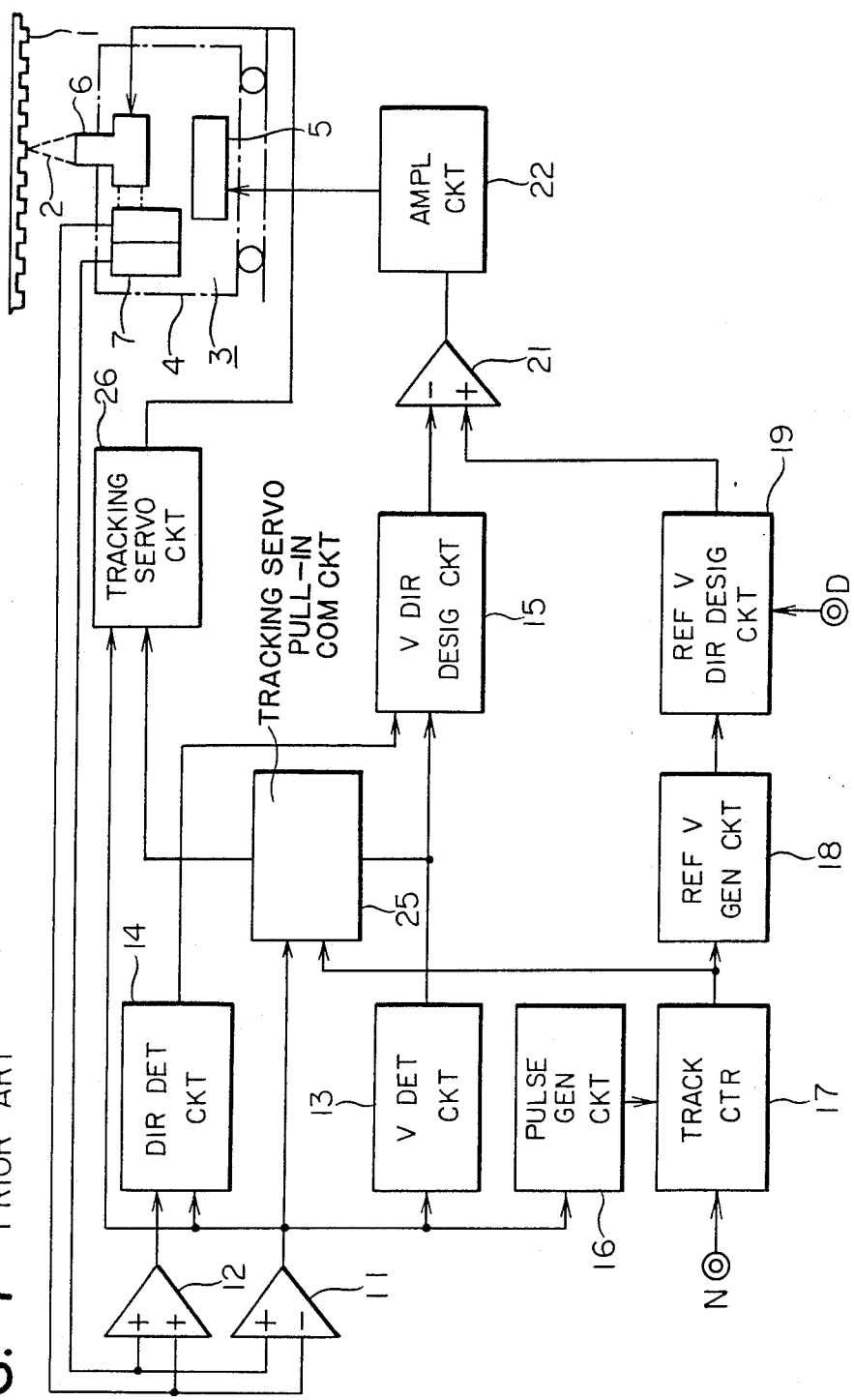
FIG. 7 is a block diagram showing a control system of a prior art optical disk apparatus.

Next, the operation of the above embodiment will be described with reference to FIGS. 4-6. FIG. 4 is a signal waveform diagram showing the respective signal waveforms of the first waveshaping means and second waveshaping means where the first position signal and the second position signal do not include momentary omissions. FIG. 5 is a signal waveform diagram showing the respective signal waveforms of the first waveshaping means and the second waveshaping means where the first position signal and second position signal include momentary omissions which occur during the predetermined delay time. FIG. 6 is a signal waveform diagram showing the respective signal waveform of the first waveshaping means and the second waveshaping means where the first position signal and the second position signal include momentary omissions after the predetermined delay time.

Initially, the signal which corresponds to the number of the tracks of the optical disk 1 to be traversed to reach the target track is applied to the track counter 17. Since the track counter 17 does not initially contain the first shaped position signal from the first waveshaping means 30, it counts this number of the tracks to be accessed as the number of the remaining tracks and produces the count signal corresponding thereto. Upon receiving this count signal, the reference velocity generator circuit 18 determines and stores the reference velocity pattern and produces the first reference velocity signal thereof. The reference velocity direction designation circuit 19 receives this reference velocity signal and produces the reference velocity signal including the direction designated by the externally applied direction signal indicative of the direction in which the spot of the light beam 2 is to move. Since the velocity error detection circuit 21 does not initially contain the velocity signal of the designated direction from the velocity direction designation circuit 15, it produces this reference velocity signal having the designated direction as the velocity error signal. This velocity error signal is amplified by the amplifier circuit 22 to control the velocity of the head actuator 5.

When, under the velocity control, the spot of the light beam 2 traverses a track, the photodetector unit 7 senses the changes in the quantities of reflected light from the optical disk 1 and produces electric signals corresponding thereto. The subtractive amplifier 11 receives the electric signals and performs the subtractive amplification to produce the first position signal, i.e., the difference signal, while the additive amplifier 12 receives the same electric signals and performs the additive amplification to produce the second position signal, i.e., the sum signal. The waveform converter 31 receives the first position signal or the second position signal and, in the absence of a momentary omission in the first position signal or in the second position signal (refer to (a) in FIG. 4), produces the first position pulse signal or the second position pulse signal (refer to (b) in FIG. 4) in which the positive half wave and the negative half wave correspond to a rectangular pulse and to a zero output for each cycle, respectively. The shift register 32 receives the first position pulse signal or the second position pulse signal and produces the first shift pulse signal or the second shift pulse signal (refer to (c) in FIG. 4) which rises with a predetermined delay time (T) based on the clock signal from the clock signal generator circuit 55 and which falls simultaneously with the first position pulse signal or the second position pulse signal, respectively. The inverter 33 receives the first position pulse signal or the second position pulse signal from the waveform converter circuit 31 and produces the first inverted position pulse signal or the second inverted position pulse signal of inverted polarity (refer to (d) in FIG. 4). The inverting shift register 34 receives the first inverted position pulse signal or the second inverted position pulse signal from the inverter 33 and produces the first inverted shift pulse signal or the second inverted shift pulse signal (refer to (e) in FIG. 4) which rises with the predetermined delay time (T) based on the clock signal from the clock signal generator circuit 55 and which falls simultaneously with the first inverted position pulse signal or the second inverted position pulse signal, respectively. When the flip-flop circuit 35 receives the rectangular pulse of the first shift pulse signal or the second shift pulse signal from the shift register 32, it produces the first shaped position signal or the second shaped position signal in which the rectangular pulse rises simultaneously with the reception of the shift pulse signal and continues until the rectangular pulse of the first inverted shift pulse signal or the second inverted shift pulse signal is subsequently received from the inverting shift register 34, respectively.

When the first position signal or the second position signal which the waveform converter circuit 31 receives includes a momentary omission (refer to (a) in FIG. 5 or (a) in FIG. 6), a first position pulse signal or a second position pulse signal (refer to (b) in FIG. 5 or (b) in FIG. 6) which has a momentary omission at the same point in time is produced. When the point in time of the occurrence of the momentary omission lies within the predetermined delay time (T), upon receiving the first position pulse signal or the second position pulse signal which includes the momentary omission, the shift register 32 produces a first shift pulse signal or a second shift pulse signal (refer to (c) in FIG. 5) that rises with the predetermined delay time (T) after the point in time at which the position pulse signal rises following the momentary omission. The first shift pulse signal or the second shift pulse signal falls simultaneously with the first position pulse signal or the second position pulse signal, respectively. In addition, the inverter 33 receives the first position pulse signal or the second position pulse signal having the momentary omission from the waveform converter circuit 31 and produces the first inverted position pulse signal or the second inverted position pulse signal of inverted polarity (refer to (d) in FIG. 5). The inverting shift register 34 receives the first inverted position pulse signal or the second inverted position pulse signal from the inverter 33 and produces the first inverted shift pulse signal or the second inverted shift pulse signal (refer to (e) in FIG. 5) which rises with the predetermined delay time (T) based on the clock signal from the clock signal generator circuit 55 and which falls simultaneously with the first inverted position pulse signal or the second inverted position pulse signal, respectively. The rectangular pulse of the first shift pulse signal or the second shift pulse signal in this case is shorter than the first inverted shift pulse signal or the second inverted shift pulse signal by a time interval which lapses after the rectangular pulse of the first position pulse signal or the second position pulse signal rises until it rises again after the occurrence of the momentary omission, respectively. The flip-flop circuit 35 alternately receives the first shift pulse signal or the second shift pulse signal from the shift register 32 and the first inverted shift pulse signal or the second inverted shift pulse signal from the inverting shift register 34 and produces the first shaped position signal or the second shaped position signal having no momentary omission (refer to (f) in FIG. 5). Here, for the above reason, the rectangular pulse of the first shaped position signal or the second shaped position signal corresponding respectively to the rectangular pulse of the first position pulse signal or the second position pulse signal is shorter than the corresponding first inverted position pulse signal or the second inverted position pulse signal.

When the point in time of the occurrence of the momentary omission is later than the predetermined delay time (T), upon receiving the first position pulse signal or the second position pulse signal which involves the momentary omission, the shift register 32 produces the first shift pulse signal or the second shift pulse signal (refer to (c) in FIG. 6) which rises with the predetermined delay time (T) similar to the case of the absence of the momentary omission, falls at the point of time of the occurrence of the momentary omission, and rises again with the predetermined delay time (T) after the point in time when the momentary omission ends and falls simultaneously with the first position pulse signal or the second position pulse signal, respectively. The inverter 33 receives the first position pulse signal or the second position pulse signal having the momentary omission from the waveform converter circuit 31 and produces the first inverted position pulse signal or the second inverted position pulse signal of inverted polarity (refer to (d) in FIG. 6). The inverting shift register 34 receives the first inverted position pulse signal or the second inverted position pulse signal from the inverter 33 and produces the first inverted shift pulse signal or the second inverted shift pulse signal (refer to (e) in FIG. 6) which rises with the predetermined delay time (T) based on the clock signal from the clock signal generator circuit 55 and which falls simultaneously with the first inverted position pulse signal or the second inverted position pulse signal, respectively. The rectangular pulse of the first shift pulse signal or the second shift pulse signal in this case is separated into two parts. However, even when the flip-flop circuit 35 is supplied from the shift register 32 with the two separated parts of the rectangular pulse of the first shift pulse signal or the second shift pulse signal, it produces the first shaped position signal or the second shaped position signal (refer to (f) in FIG. 6) formed of a single rectangular pulse which continues until the rectangular pulse of the first inverted shift pulse signal or the second inverted shift pulse signal is subsequently received from the inverting shift register 34, respectively. This is the same as in the case where the first position signal or the second position signal does not involve the momentary omission. The velocity detection circuit 53 receives the first shaped position signal and detects the velocity signal from the period of the received signal and delivers a substantially accurate velocity signal even if the first position signal produced by the subtractive amplifier 11 involves a momentary omission. The direction detection circuit 54 detects the direction signal on the basis of the first and second shaped position signals and in view of the phase relationship thereof. Further, the track counter 17 produces a count signal precisely indicating the number of remaining tracks to reach the target track on the basis of the first shaped position signal and in accordance with the rectangular pulse thereof. Since the subsequent operations of the optical disk driving apparatus are the same as in the case of the prior art apparatus, they are omitted here.

In the above embodiment, the clock signal generator circuit 35 compares the velocity signal from the velocity detection circuit 53 and the externally applied velocity setting signal and produces a clock signal of high frequency when the velocity signal is greater than the velocity setting signal and of low frequency when the velocity signal is smaller than the velocity setting signal. Although, in the embodiment described, the velocity detection circuit 53 and the track counter 17 receive the first shaped position signal produced by the first waveshaping means 30, the intended purpose is achieved even when they receive the second shaped position signal produced by the second waveshaping means 40. Further, the shift register 32 and the inverting shift register 34 selectively receive the two clock signals of unequal frequencies from the clock signal generator circuit 55. They may also receive clock signals of different frequencies in accordance with the moving velocity of the spot of the light beam 2.

As described above, this invention comprises an optical disk driving apparatus wherein a tracking actuator furnished with a condensing lens, which forms a spot of a light beam on tracks disposed on a surface of a rotating disk and which moves the spot to traverse a predetermined number of tracks, and a photosensor unit, which senses the quantities of the light beam reflected from the disk surface and converts them into electric signals, are mounted on a carriage, the carriage is driven by a head actuator, moving the spot of the light beam in a direction traversing the track and detecting a first position signal and a second position signal indicative of a position of the spot on the tracks through addition and subtraction of the electric signals corresponding to changes in the quantities of the reflected light attendant upon the movement; a velocity signal for the movement of the spot across the track is detected on the basis of both the signals and a reference velocity signal previously determined as the number of tracks to be traversed to reach a target track are compared successively by receiving the first position signals, and the head actuator is subjected to a velocity control; when the moving velocity of the spot has become lower than a predetermined velocity at a predetermined track before the target track, the tracking actuator is subjected to position control, thereby to position the spot on the target track; the apparatus comprising, for the oscillating waveform of the first position signal, a first waveshaping means for causing the half wave of the waveform that is greater than the mean of the waveform and the half wave of the waveform that is smaller than the mean of the oscillating waveform of said first position signal to correspond respectively to a single rectangular pulse and to a zero amplitude signal for each cycle of the waveform and for converting the rectangular pulse and the zero amplitude signal into a signal delayed by a predetermined time and, for the oscillating waveform of the second position signal, a second waveshaping means for causing the half wave of the waveform that is greater than the mean of the waveform and the half wave of the waveform that is smaller than the mean of the oscillating waveform to correspond respectively to a single rectangular pulse and to a zero amplitude signal for each cycle and for converting the rectangular pulse and zero amplitude signal into a second shaped position signal delayed by a predetermined time. Therefore, the invention brings forth the effect that, even if information recorded in the form of a pit on a track or a defect on a track or between tracks causes momentary omissions in the first position signal and the second position signal at the time of movement of the spot of the light beam across the track or tracks of an optical disk, an accurate number of remaining tracks is counted and a more accurate velocity signal is detected whereby the spot of the light beam can be efficiently positioned to the target track.

What is claimed is:

1. In an optical-disk driving apparatus wherein a tracking actuator furnished with a condensing lens, which forms a spot of a light beam on tracks provided at predetermined intervals on a surface of a rotating disk and which permits the spot to traverse the tracks in a predetermined number, and a photosensor unit which senses quantities of reflected light of the light beam from the disk surface and which converts them into electric signals, are mounted, on a carriage; the carriage is driven by a head actuator, to move the spot in a direction of traversing the tracks and to detect a first position signal and a second position signal indicative of a position of the spot on the tracks through addition and subtraction of the electric signals corresponding to changes of the quantities of the reflected light attendant upon the movement; while a velocity signal at the movement of the spot across the track as detected on the basis of both the signals and a reference velocity signal previously determined by a number of tracks to be accessed to a target track as externally applied are being compared successively by receiving the first position signals, the head actuator is subjected to a velocity control; and when the moving velocity of the spot has become lower than a predetermined velocity at a predetermined track before the target track, the tracking actuator is subjected to a position control, thereby to position the spot to the target track; an optical-disk driving apparatus characterized by comprising first waveshaping means for causing a half wave greater and a half wave smaller than an arithmetic mean value of maximum and minimum values of an oscillating waveform of said first position signal to correspond to a single square pulse and a zero output as to each cycle, respectively, and for converting them into a first shaped position signal delayed for a predetermined time, and second waveshaping means for causing a half wave greater and a half wave smaller than an arithmetic mean value of maximum and minimum values of an oscillating waveform of said second position signal to correspond to a single square pulse and a zero output as to each cycle, respectively, and for converting them into a second shaped position signal delayed for a predetermined time.

2. An optical-disk driving apparatus as defined in claim 1, wherein said first waveshaping means is constructed of a waveform converter circuit for converting the first position signal into a first position pulse signal in which the half wave greater and the half wave smaller than the arithmetic mean value of the maximum and minimum values of the oscillating waveform of said first position signal correspond to the square pulse and the zero output as to each cycle, respectively, a shift register for receiving the first position pulse signal and producing a first shift pulse signal which rises with the delay of the predetermined time on the basis of a clock signal from a clock signal generator circuit disposed outside and which falls simultaneously with said first position pulse signal, an inverter for receiving said first position pulse signal and producing a first inverted position pulse signal of inverted polarity, an inverting shift register for receiving the first inverted position pulse signal and producing a first inverted shift pulse signal which rises with the delay of the predetermined time on the basis of the clock signal from said clock signal generator circuit and which falls simultaneously with said first inverted position pulse signal, and a flip-flop circuit for producing the first shaped position signal in which, in response to an input of either one of the first shift pulse signal and the first inverted shift pulse signal, the square pulse or the zero output continues until the other of the pulse signals is received next.

3. An optical-disk driving apparatus as defined in claim 1, wherein said second waveshaping means is constructed of a waveform converter circuit for converting the second position signal into a second position pulse signal in which the half wave greater and the half wave smaller than the airthmetic mean value of the maximum and minimum values of the oscillating waveform of said second position signal correspond to the square pulse and the zero output as to each cycle, respectively, a shift register for receiving the second position pulse signal and producing a second shift pulse signal which rises with the delay of the predetermined time on the basis of a clock signal from a clock signal generator circuit disposed outside and which falls simultaneously with said second position pulse signal, an inverter for receiving said second position pulse signal and producing a second inverted position pulse signal of inverted polarity, an inverting shift register for receiving the second inverted position pulse signal and producing a second inverted shift pulse signal which rises with the delay of the predetermined time on the basis of the clock signal from said clock signal generator circuit and which falls simultaneously with said second inverted position pulse signal, and a flip-flop circuit for producing the second shaped position signal in which, in response to an input of either one of the second shift pulse signal and the second inverted shift pulse signal, the square pulse or the zero output continues until the other of the pulse signals is received next.

4. An optical-disk driving apparatus as defined in claim 2, wherein said clock signal generator circuit compares the velocity signal at the movement of the spot of the light beam across the track and a velocity setting signal applied and set from outside, and it selectively produces the clock signal of high frequency when the velocity signal is greater than the velocity setting signal and the clock signal of low frequency when the former is smaller than the latter.

5. An optical-disk driving apparatus as defined in claim 3, wherein said clock signal generator circuit compares the velocity signal at the movement of the spot of the light beam across the track and a velocity setting signal applied and set from outside, and it selectively produces the clock signal of high frequency when the velocity signal is greater than the velocity setting signal and the clock signal of low frequency when the former is smaller than the latter.

* * * * *

UNITED STATES PATENT AND TRADEMARK OFFICE
CERTIFICATE OF CORRECTION

PATENT NO. : 4,901,299

DATED : Feb. 13, 1990

INVENTOR(S) : Nakatsu

It is certified that error appears in the above-identified patent and that said Letters Patent is hereby corrected as shown below:

Columns 13 thru 16 should be deleted to appear as per attached columns.

Signed and Sealed this

Sixth Day of August, 1991

*Attest:*

HARRY F. MANBECK, JR.

*Attesting Officer*  Commissioner of Patents and Trademarks position signal and a second position signal indicative of a position of the spot on the tracks through addition and subtraction of the electric signals corresponding to changes in the quantities of the reflected light attendant upon the movement; a velocity signal for the movement of the spot across the track is detected on the basis of both the signals and a reference velocity signal previously determined as the number of tracks to be traversed to reach a target track are compared successively by receiving the first position signals, and the head actuator is subjected to a velocity control; when the moving velocity of the spot has become lower than a predetermined velocity at a predetermined track before the target track, the tracking actuator is subjected to position control, thereby to position the spot on the target track; the apparatus comprising, for the oscillating waveform of the first position signal, a first waveshaping means for causing the half wave of the waveform that is greater than the mean of the waveform and the half wave of the waveform that is smaller than the mean of the oscillating waveform of said first position signal to correspond respectively to a single rectangular pulse and to a zero amplitude signal for each cycle of the waveform and for converting the rectangular pulse and the zero amplitude signal into a signal delayed by a predetermined time and, for the oscillating waveform of the second position signal, a second waveshaping means for causing the half wave of the waveform that is greater than the mean of the waveform and the half wave of the waveform that is smaller than the mean of the oscillating waveform to correspond respectively to a single rectangular pulse and to a zero amplitude signal for each cycle and for converting the rectangular pulse and zero amplitude signal into a second shaped position signal delayed by a predetermined time. Therefore, the invention brings forth the effect that, even if information recorded in the form of a pit on a track or a defect on a track or between tracks causes momentary omissions in the first position signal and the second position signal at the time of movement of the spot of the light beam across the track or tracks of an optical disk, an accurate number of remaining tracks is counted and a more accurate velocity signal is detected whereby the spot of the light beam can be efficiently positioned to the target track.

What is claimed is:

1. An optical disk reading head controller apparatus for accurately positioning a reading head relative to a designated track on an optical disk in response to signals indicating the position and direction of the designated track relative to other tracks on the disk comprising:

a carriage;

a tracking actuator mounted on the carriage and having a condensing lens for forming a spot of a light beam on tracks disposed at predetermined intervals on a surface of a rotating disk, said carriage transporting said tracking actuator, whereby the spot traverses the tracks;

a two element photosensor unit mounted on said carriage for sensing the quantities of the light beam that are reflected from the disk surface and for generating first and second electric signals corresponding to changes in quantities of light reflected from the disk upon movement of the spot;

a head actuator for driving said carriage;

a clock signal generator circuit for generating a clock signal;

means for generating first position and second position oscillating waveform signals, each having two half waves per cycle and indicative of a position of the spot on the tracks, by respectively adding and subtracting the first and second electric signals;

first waveshaping means responsive to said clock signal for causing the half wave of the first position waveform signal that is greater than the mean of the first position waveform and the half wave of the first position waveform signal that is smaller than the mean of the first position waveform to correspond respectively to a single rectangular pulse and a zero amplitude signal for each cycle of the first position waveform and for converting the rectangular pulse and zero amplitude signal into a first shaped position signal delayed for a predetermined time by the clock signal;

second waveshaping means responsive to said clock signal for causing the half wave of the second position waveform signal that is greater than the mean of the second position waveform and the half wave of the second position waveform signal that is smaller than the mean of the second position waveform to correspond respectively to a single rectangular pulse and a zero amplitude signal for each cycle of the second position waveform, and for converting the rectangular pulse and zero amplitude signal into a second shaped position signal delayed for the predetermined time by the clock signal whereby any momentary omissions in said first and second position waveforms do not appear in said first and second shaped position signals; and means for successively comparing a first velocity signal, determined from said first and second shaped position signals, and a second velocity signal, determined from the first shaped position signal and an external signal indicating the number of tracks to be traversed to reach a target track, to the first shaped position signal for controlling said head actuator to position the spot on the target track whereby the number of tracks traversed is accurately counted when said first and second position signal waveforms contain omissions.

2. The optical disk reading head controller apparatus of claim 1 wherein said first waveshaping means comprises a waveform converter circuit for converting the first position oscillating waveform signal into a first position pulse signal having a rectangular pulse waveform and a zero amplitude output signal corresponding respectively to, for each cycle of the first position oscillating waveform signal, the half wave of the first position oscillating waveform signal that is greater and the half wave of the first position oscillating waveform signal that is smaller than the mean of the first position oscillating waveform, a shift register receiving the first position signal for producing a first shift pulse signal which rises with the first position signal after a delay time based on the clock signal received from said clock signal generator circuit and which falls simultaneously with the first position pulse signal, an inverter receiving the first position pulse signal for producing a first inverted position pulse signal having a polarity inverted from the polarity of the first position pulse signal, an inverting shift register receiving the first inverted position pulse signal for producing a first inverted shift pulse signal which rises with the first inverted position pulse signal after the predetermined delay time and which falls simultaneously with the first inverted position pulse signal, and a flip-flop circuit receiving the first shift pulse signal and the first inverted shift pulse signal for producing the first shaped position signal whereby the zero amplitude signal and the rectangular pulse of the first shaped position signal rises and falls, respectively, only upon receipt of a first shift pulse signal after receipt of a first inverted shift pulse signal and vice versa.

3. The optical disk reading head controller apparatus of claim 2, said clock signal generator circuit for comparing a third velocity signal, determined from said first shaped position signal, upon the movement of the spot of the light beam across a track and an externally applied velocity setting signal, said circuit selectively producing a relatively high frequency clock signal when the third velocity signal is greater than the velocity setting signal and a relatively low frequency clock signal when the third velocity signal is smaller than the velocity setting signal.

4. The optical disk reading head controller apparatus of claim 1 wherein said second waveshaping means comprises a waveform converter circuit for converting the second position oscillating waveform signal into a second position pulse signal having a rectangular pulse waveform and a zero amplitude output signal corresponding respectively to, for each cycle of the second position oscillating waveform signal, the half wave of the second position oscillating waveform signal that is greater and the half wave of the second position oscillating waveform signal that is smaller than the mean of the second position oscillating waveform, a shift register receiving the second position signal for producing a second shift pulse signal which rises with the second position signal after a delay time based on the clock signal received from said clock signal generator circuit and which falls simultaneously with the second position pulse signal, an inverter receiving the second position pulse signal for producing a second inverted position pulse signal having a polarity inverted from the polarity of the second position pulse signal, an inverting shift register receiving the second inverted position pulse signal for producing a second inverted shift pulse signal which rises with the second inverted position pulse signal after the predetermined delay time and which falls simultaneously with the second inverted position pulse signal, and a flip-flop circuit receiving the second shift pulse signal and the second inverted shift pulse signal for producing the second shaped position signal whereby the zero amplitude signal and the rectangular pulse of the second shaped position signal rises and falls, respectively, only upon receipt of a second shift pulse signal after receipt of a second inverted shift pulse signal and vice versa.

5. The optical disk reading head controller apparatus of claim 4, said clock signal generator circuit for comparing a third velocity signal, determined from said first shaped position signal, upon the movement of the spot of the light beam across a track and an externally applied velocity setting signal, said circuit selectively producing a relatively high frequency clock signal when the third velocity signal is greater than the velocity setting signal and a relatively low frequency clock signal when the third velocity signal is smaller than the velocity setting signal.

* * * * *